W. S. GRAHAM.
FAUCET.
APPLICATION FILED APR. 19, 1909.

962,084.

Patented June 21, 1910.

Witnesses

Inventor:
William Sydney Graham
By Heidman & Street Attys.

UNITED STATES PATENT OFFICE.

WILLIAM SYDNEY GRAHAM, OF CHICAGO, ILLINOIS, ASSIGNOR TO FEDERAL-HUBER COMPANY, OF CHICAGO, ILLINOIS, A CORPORATION OF ILLINOIS.

FAUCET.

962,084.      Specification of Letters Patent.    Patented June 21, 1910.

Application filed April 19, 1909. Serial No. 490,805.

*To all whom it may concern:*

Be it known that I, WILLIAM SYDNEY GRAHAM, a citizen of the United States, and resident of Chicago, in the county of Cook and State of Illinois, have invented certain new and useful Improvements in Faucets, of which the following is a description, reference being had to the accompanying drawing, which forms a part of my specification.

This invention relates to a novel construction of faucet or other valve, the object being to provide a simple and efficient device which closes with the water pressure, but is prevented from "hammering" and therefore not subject to the wear caused thereby; the invention consisting in features of construction hereinafter fully described and claimed.

Figure 1:
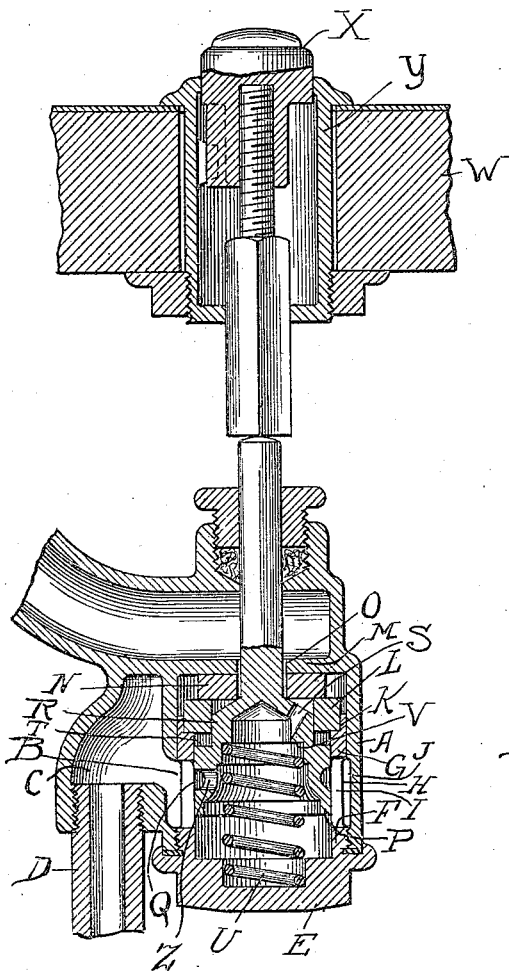
Figure 2:
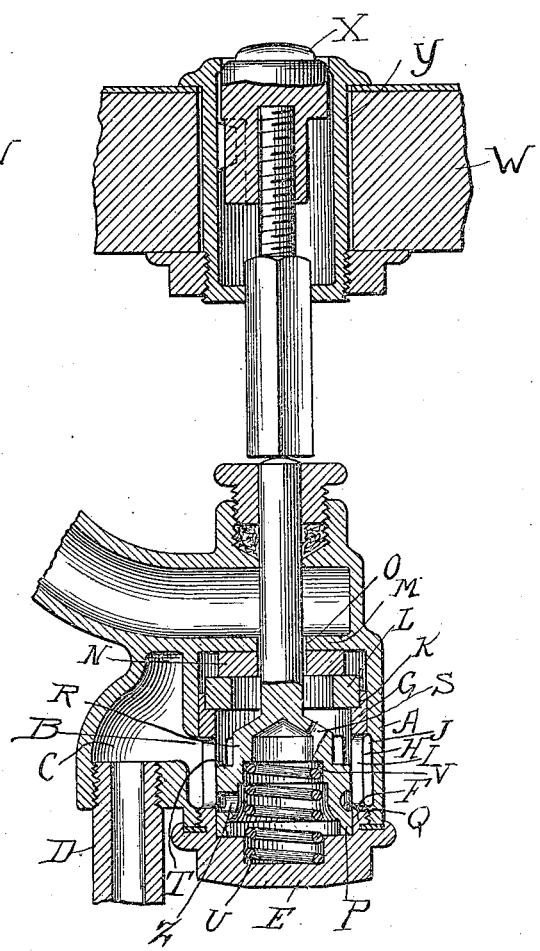

In the acompanying drawing—Figures 1 and 2 are central vertical longitudinal sections of a faucet constructed in accordance with my invention showing the same in closed and open positions respectively, and also showing one form of device for actuating the same.

Usually in faucets or valves which close with the pressure and in which the valve-stem is reciprocated by a direct pressure as distinguished from a helically movable actuating device, the valve is inclined to close so suddenly as to "hammer". This is undesirable not only on account of the noise occasioned, but also because of the wear and tear on the entire service system caused thereby.

Many attempts have been made to produce slow closing valves which close in the direction of flow of the water, or as usually termed with the pressure, and in most instances attempts have been made to employ an air cushion to control the final closing movement of the valve and make the movement sufficiently slow to prevent "hammering". In view however, of the great variations in service pressure encountered in different cities, air cushions have been found more or less ineffective, especially where a high service pressure is maintained. In my invention water is employed to provide a cushion as the valve approaches its seat, in order that the seating of the valve may be regulated.

In the accompanying drawing A indicates the valve-casing of the valve or faucet, the interior of which is preferably cylindrical and provided with lateral openings B through which communication with a service chamber C is effected; the latter being connected by means of the pipe D with the service. The said casing A is sealed at one end by means of a cap E provided with an annular flange F which is externally threaded adjacent its base and is equipped with a smooth cylindrical sleeve-portion G. The sleeve-portion G is provided with an annular groove or dished portion H. At this point the sleeve is also provided with a plurality of openings I, (see Fig. 2) through which the water is adapted to enter from the annular space J formed by the groove or dished portion H, and a similar groove in the wall of casing A.

In the upper end the sleeve-portion G is provided internally with an annular groove K to form a shoulder on which a washer L of brass or other suitable material seats. Interposed between this washer L and the wall M of casing A is a valve-seat N, consisting preferably of hard rubber, which is provided with a central opening registering with the central opening O in said upper wall M of the casing.

The valve P is of the hollow open-ended type and fits loosely within sleeve portion G, and is provided between its ends with an annular groove Q. The upper end portion R of said valve P is annularly reduced and adapted to fit within the central opening in washer L. The tapered upper wall of the portion R of valve P seats on the valve-seat N as shown in Fig. 1. When the valve P is closed the lower end of the same is slightly above the lower end of openings I as clearly shown in Fig. 1, thus permitting water to get beneath the valve.

An opening Z, preferably located in the groove Q in valve P, establishes communication between the valve-interior and the service chamber C through opening B when the valve is open and its bottom is below opening I as seen in Fig. 2. This permits water to pass to the valve-interior when the valve is open, so that the service-pressure may be used to aid the valve in returning to its seat, until the valve has risen far enough to allow the water to flow in below as previously stated, when the pressure on the valve will of course be greater and insure the seating of the valve.

An opening S in the tapered upper wall R of valve P serves to establish communication between the space within and the upper portion of the chamber within which the valve operates. This opening S permits of the displacement of the water within the chamber and valve when the latter is being opened, so that the pressure on the upper and lower surfaces of the valve will be more or less equalized.

Between the shoulder T of the valve P, the lower face of the washer L, and the upper portion of sleeve G, an annular space is left when the valve is closed, in which water is confined as soon as the shoulder T has passed the uppermost ends of openings I and portion R has entered washer L during the closing movement of valve P. The fit between the portion R of valve P and the washer L when the valve is closed is made rather snug but not so as to hinder the movement of the valve. As the valve continues toward its seat, this space above shoulder T is contracted and the water confined therein not being able to exhaust rapidly, by reason of the comparatively snug fit of the parts, forms a water-cushion for the valve, holding the latter against a quick closure. It is apparent that the speed at which the valve will be able to seat itself is regulated by the time taken by the water forming the water-cushion, to exhaust, and this in turn may be controlled by the snugness of fit of the respective parts.

A spring U is interposed between the cap E and an annular shoulder V formed within said valve P, and with the water pressure heretofore mentioned aids in returning the valve to its seat and serves to maintain said valve normally on its seat.

The washer L and valve-seat N may of course be made of any suitable material other than that heretofore mentioned, although I prefer to employ the material heretofore mentioned.

It is apparent that I obtain the water-cushion without necessarily enlarging the valve or its casing, as the cushion is obtained by utilizing space which ordinarily would be wasted.

I have shown my invention as applied to a valve of a type intended to be disposed below the slab W of a basin and operated by means of a push-button X which is shown reciprocally movable in a sleeve Y located in an opening in the slab W, but it is understood that the vertical style of type of valve and the method of operating the same may be altered without departing from the spirit of my invention, and I do not wish to be understood as limiting myself to the exact construction shown and described, but

What I claim as my invention and wish to secure by Letters Patent, is:—

1. A faucet comprising a chamber communicating with a source of water-supply and having an outlet, a valve reciprocally mounted in said chamber, the chamber and valve being so formed as to provide a waterspace intermediate of the valve and the outlet when the valve approaches its seat, means whereby the water in said space is temporarily retained but allowed to exhaust slowly, mechanism for forcing the valve to its seat, and means whereby the pressure of the supply may be utilized to hold the valve to its seat.

2. A faucet comprising a chamber communicating with a source of supply and provided with an outlet, a spring-controlled valve reciprocally mounted in said chamber, the outlet end of the chamber being contracted to provide a fluid-cushion intermediate of the valve and the outlet, the relation between the valve and the wall of the chamber being such as to permit the fluid forming the cushion to exhaust slowly and regulate the seating of the valve, and means whereby the pressure of the supply may be utilized to force the valve toward and retain it on its seat.

3. In a faucet, a chamber communicating with a source of supply of fluid under pressure and having an outlet, the portion of the chamber adjacent to the outlet being stepped, a valve reciprocally movable in said valve-chamber and controlling said outlet, the end of the valve adjacent to the outlet being correspondingly stepped to form an annular fluid chamber between the valve and the walls of said valve-chamber which is longitudinally contracted as the valve approaches its seat, mechanism intermediate of the valve and one end of the chamber to force the valve toward its seat, and means whereby the pressure of the fluid flowing into the chamber will retain said valve on its seat.

4. A faucet provided with a chamber having communication with a source of supply and provided with an outlet, a valve mounted in said chamber and adapted to control said outlet, means whereby the pressure of the supply is utilized to maintain the valve on its seat, and means whereby this pressure may be equalized on both sides of the valve when the latter is to be opened.

5. A faucet provided with a chamber communicating with a source of supply under pressure, said chamber also having an outlet, a valve slidably mounted in said chamber and normally closing said outlet, means whereby the pressure of the supply may constantly be directed on the valve in the direction of its seat and utilized in returning the valve to its normal position, and means for establishing communication between the upper and lower sides of the valve whereby said pressure may be equalized on both sides of the valve when the latter is being forced from its normal position.

6. In a faucet, a valve-chamber communicating between its ends with a source of supply of fluid under pressure, a valve-seat at the delivery end of said valve-chamber, a hollow open-ended valve reciprocally movable in said chamber, said valve being annularly reduced adjacent the end seating on said valve-seat and said valve-chamber having an annularly contracted portion receiving said reduced portion of said valve, whereby an annular fluid chamber is formed between the reduced portions of said valve and the contracted portion of the chamber when the valve approaches its seat, said fluid-chamber being longitudinally contracted by the movement of said valve toward its seat as the fluid discharges from said fluid-chamber, mechanism located within said valve whereby the valve is forced toward its seat, and means whereby the pressure of the supply may be utilized in aiding the return and holding the valve on its seat.

7. In a faucet, a valve-chamber communicating between its ends with a source of supply of fluid under pressure, a valve-seat at the delivery end of said valve-chamber, a hollow open-ended valve reciprocally movable in said valve-chamber and having its body portion covering a portion of the inlet to the chamber when said valve is seated, the end portion of said valve-chamber between the inlet and outlet and said valve being annularly reduced adjacent to the seating end thereof whereby an annular fluid chamber is formed, said fluid chamber being adapted to contract gradually and control the movements of said valve toward its seat, and means whereby a constant communication between the source of supply and the valve-interior is maintained to utilize the pressure of the supply in returning said valve to its seat.

8. In a faucet, a valve-chamber communicating between its ends with a source of supply of fluid under pressure, a valve-seat at the delivery end of said valve-chamber, a hollow open-ended valve reciprocally movable in said chamber and partially covering the inlet thereof when seated, said valve-chamber and valve being respectively annularly reduced at one end portion and coacting to form an annular fluid chamber between the inlet and outlet to said chamber when the valve approaches its seat, whereby the final closing of the valve is determined, the valve being provided with an opening whereby communication between the upper and lower surfaces of the valve is established to permit of the fluid pressure on both sides of the valve to become substantially equalized during the movement of the valve.

9. In a faucet, a valve-chamber communicating between its ends with a source of supply of fluid under pressure, a valve-seat at the delivery end of said valve-chamber, a trunk piston valve reciprocally movable therein and partially covering the inlet to the chamber when seated, said valve-chamber and valve being respectively annularly reduced at one end and coacting to form an annular fluid chamber adjacent to the outlet end of the chamber when the valve approaches its seat, the valve being provided with an opening in its upper surface whereby communication between the upper and lower part of the chamber is established and the fluid pressure exerted on the valve partially equalized during the movement of the valve, and a spring normally maintaining said valve on its seat.

10. In a faucet, a chamber communicating with a source of supply and provided with an outlet, a hollow piston-valve adapted to reciprocate in said chamber and close with the pressure, the chamber and valve being so formed as to provide a fluid-cushion intermediate of the valve and its seat, mechanism for returning said valve to its seat, and means whereby the pressure of the supply aids said mechanism in returning the valve and retaining it on its seat.

11. In a faucet, a chamber having an inlet and an outlet, a valve-seat located at the outlet, a hollow piston-valve reciprocally mounted in said chamber, said chamber and valve being so formed as to provide a fluid-cushion intermediate of the valve and the outlet-end of the chamber, the valve being provided with openings which communicate with the inlet opening and the space intermediate of the valve and the outlet end of the chamber whereby the fluid may pass into said valve-interior, and mechanism acting against said valve to return it to its seat.

12. A faucet provided with a chamber having inlet and outlet openings, a sleeve provided with ports and taking within said chamber, said sleeve being dished to provide a passage about its periphery, a hollow piston-valve mounted within said sleeve, said valve being provided with an opening in its side wall whereby the fluid from the source of supply may exert its pressure against the valve-interior and toward the outlet opening, and mechanism for returning the valve to its normal position.

13. A faucet comprising an open-ended cylindrical casing having inlet and outlet openings, a sleeve with a closed end located in said casing, said sleeve being provided with elongated openings in its periphery, a portion of the sleeve and casing being dished to provide a water-way about the sleeve with which the openings communicate, a hollow valve reciprocally mounted within said sleeve, the valve being provided with an opening in its side wall whereby the water from the inlet opening is constantly entering within said valve to maintain the valve in its normal position, means whereby the pressure on both sides of the valve will be equalized when the valve is being opened, and mechanism for returning the valve to its normal position.

WILLIAM SYDNEY GRAHAM.

Witnesses:
F. C. PERKINS,
A. D. SANDERS, Jr.